United States Patent
Fiedler et al.

(10) Patent No.: US 10,336,343 B1
(45) Date of Patent: Jul. 2, 2019

(54) SYSTEMS AND METHODS FOR PROXIMATE EVENT CAPTURE

(71) Applicant: United Services Automobile Association (USAA), San Antonio, TX (US)

(72) Inventors: Kevin K. Fiedler, Boerne, TX (US); Don M. Livesay, San Antonio, TX (US); Amanda S. Danko, San Antonio, TX (US); Michael J. Szentes, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 16/012,260

(22) Filed: Jun. 19, 2018

Related U.S. Application Data

(63) Continuation of application No. 15/131,584, filed on Apr. 18, 2016, now Pat. No. 10,023,201.

(60) Provisional application No. 62/163,093, filed on May 18, 2015.

(51) Int. Cl.
*B60W 40/10* (2012.01)
*G06Q 40/08* (2012.01)
*G07C 5/00* (2006.01)

(52) U.S. Cl.
CPC ............ *B60W 40/10* (2013.01); *G06Q 40/08* (2013.01); *G07C 5/008* (2013.01); *B60W 2510/182* (2013.01); *B60W 2520/10* (2013.01); *B60W 2540/22* (2013.01); *B60W 2540/26* (2013.01)

(58) Field of Classification Search
CPC ........ B60W 40/10; G06Q 40/08; G07C 5/008
USPC ...................................................... 701/32.2
See application file for complete search history.

(56) References Cited

U.S. PATENT DOCUMENTS

| | | | | |
|---|---|---|---|---|
| 2010/0157061 A1* | 6/2010 | Katsman | ............... | G07C 5/008 348/149 |
| 2014/0066049 A1* | 3/2014 | Cho | .................... | B60W 50/085 455/420 |
| 2015/0145662 A1* | 5/2015 | Barfield, Jr. | ......... | G08B 25/016 340/436 |
| 2016/0292936 A1* | 10/2016 | Palmer | ................. | B60R 16/023 |

* cited by examiner

*Primary Examiner* — Muhammad Shafi
(74) *Attorney, Agent, or Firm* — Baker & Hostetler LLP

(57) ABSTRACT

A method includes collecting first data from a first sensor associated with a vehicle and determining, based on the first data, that an event involving the vehicle may occur. The method includes identifying a second sensor located within a proximity of the vehicle and causing the second sensor to collect second data. The method also includes associating the first data and the second data with a first event associated with the vehicle.

20 Claims, 3 Drawing Sheets

SYSTEMS AND METHODS FOR PROXIMATE EVENT CAPTURE

CROSS REFERENCE TO RELATED APPLICATIONS

This application claims the benefit of U.S. patent application Ser. No. 15/131,584 filed Apr. 18, 2016, which claims the benefit of U.S. Provisional Patent Application No. 62/163,093, filed on May 18, 2015, titled "SYSTEMS AND METHODS FOR PROXIMITY EVENT CAPTURE" the contents of which are incorporated herein by reference in their entirety.

TECHNICAL FIELD

The technical field generally relates to collection and management of sensor data and, more specifically, to methods and systems for managing collecting of sensor data in response to the occurrence of an event.

BACKGROUND

Reconstructing automobile accidents has been and can still be difficult activity. Witnesses occasionally provide contradictory testimony, participants may have an interest in emphasizing or presenting certain facts, and health and safety concerns may require moving the vehicles before their position can be fully recorded.

Accordingly, there is an unmet need to facilitate claims processing, including claims processing related to reconstructing the accident scene.

SUMMARY

Described herein are systems and methods that may be used to collect sensor data, which may facilitate insurance claims processing or vehicle accident reconstruction. Sensor data may include one or more photographs, sequences of photographs, video data, audio data, or other data. Further, sensor data may be recorded prior to an event (e.g., a vehicular accident). Optionally, collection of the sensor data may initiate in response to a trigger (e.g., braking force of the car exceeding a threshold). The sensor data may be communicated to a server.

In an aspect, the disclosure is directed to a method. The method may include collecting first data from a first sensor associated with a vehicle and determining, based on the first data, that an event involving the vehicle may occur. The method may include identifying a second sensor located within a proximity of the vehicle and causing the second sensor to collect second data. The method may also include associating the first data and the second data with a first event associated with the vehicle.

In another aspect, the disclosure is directed to a system. The system may include a processor and memory. The memory may store instructions that cause the processor to effectuate operations. The operations may include collecting first data from a first sensor associated with a vehicle and determining, based on the first data, that an event involving the vehicle may occur. The operations may include identifying a second sensor located within a proximity of the vehicle and causing the second sensor to collect second data. The operations may also include associating the first data and the second data with a first event associated with the vehicle.

According to yet another aspect, this disclosure is directed to a nontransitory computer-readable storage medium. The nontransitory computer-readable storage medium may store instructions that cause a processor executing the instructions to effectuate operations. The operations may include collecting first data from a first sensor associated with a vehicle and determining, based on the first data, that an event involving the vehicle may occur. The operations may include identifying a second sensor located within a proximity of the vehicle and causing the second sensor to collect second data. The operations may also include associating the first data and the second data with a first event associated with the vehicle.

DETAILED DESCRIPTION OF ILLUSTRATIVE EMBODIMENTS

The present disclosure describes one or more exemplary embodiments of systems and methods for capturing sensor data that is related to a proximate event. The subject matter is described below more fully with reference to the accompanying drawings. The embodiments and examples provided in this disclosure are exemplary and are not intended to be limiting. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

The singular forms "a," "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this disclosure as discussed below may include a software algorithm, program, or code residing on computer-readable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features, and advantages of the disclosure based on the above-described embodiments. Accordingly, the disclosure is not to be limited by what has been particularly shown and described, except as indicated by the appended claims. Further, although at least one series of steps are presented as an exemplary method of practicing one or more embodiments described herein, it will be appreciated by those skilled in the art that the steps identified may be practiced in any order that is practicable, including without limitation the omission of one or more steps.

Figure 1:
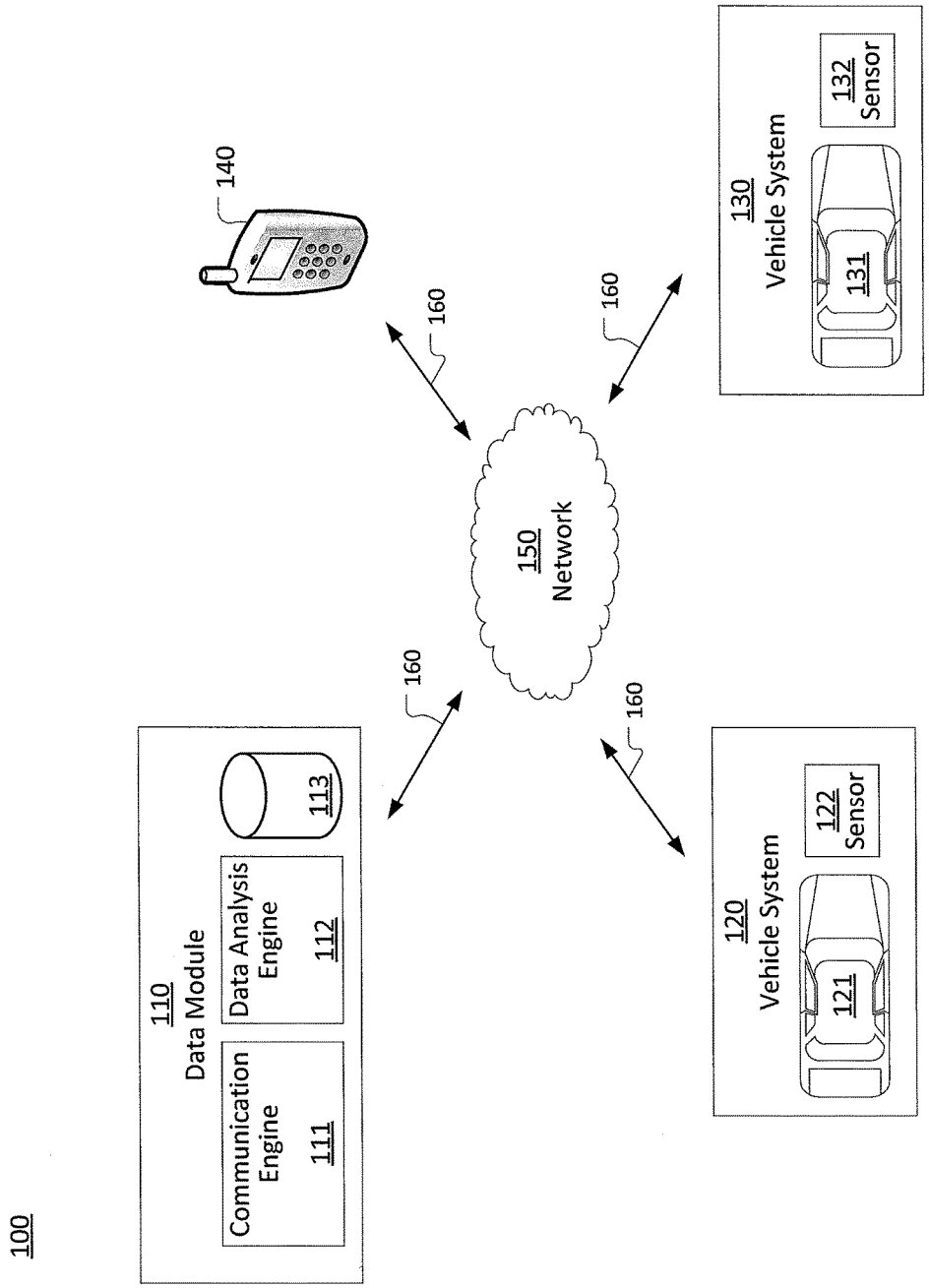
FIG. 1 illustrates an exemplary embodiment of a system for capturing data related to a proximate event.

Referring to FIG. 1, a hardware diagram depicting a system 100 in which the processes described herein can be executed is provided for exemplary purposes. System 100 may include one or more data management systems, such as a data module 110, one or more vehicle systems, such as vehicle systems 120 and 130, and one or more mobile systems, such as a mobile system 140. Data module 110, vehicle systems 120 and 130, and mobile system 140 may be communicatively connected via a network 150. Data module 110 may include a communication engine 111, a data analysis engine 112, and a database 113. Vehicle system 120 may include a vehicle 121 and a sensor 122, and vehicle system 130 may include a second vehicle 131 and a second sensor 132.

Exemplary embodiments of mobile device 140, sensor 122, and sensor 132 include, but are not limited to, mobile devices, such as a multifunction smart phones, personal computers, notebook computers, tablet computers, server devices, and software/firmware running on one or more of the same. It should be understood that devices and sensors each generally include at least one processor, at least one data interface, and at least one memory device coupled via buses. Devices and sensors may be capable of being coupled together, coupled to peripheral devices, and input/output devices.

Network 150 depicted in FIG. 1 may include a data network, which may include one or more cellular networks, local area network (LAN), a wide area network (WAN), a personal area network (PAN), or the like. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. Devices, systems, and/or sensors communicate over network 150 through one or more communications links 160. Communication links 160 may comprise any mechanism that facilitates communication between two or more devices of vehicle systems 120 and 130, and mobile system 140. For example, communication links 160 may include wired or wireless links, such as WiFi, Bluetooth, near field communication (NFC), cellular, and other wireless communication modes.

Communication engine 111 may manage communications between data module 110 and one or more of vehicle system 120, vehicle system 130. In an aspect, communication engine 111 may also manage requesting and receiving data from one or more of the same, and storing that information, such as in database 113. Data analysis engine 112 correlates and analyzes data received from vehicle system 120, vehicle system 130, and mobile device 140. This processing may include stitching together various 2D (two dimensional) images into one or more two dimensional images, stitching together 2D images into one or more 3D (three dimensional) images, or a combination thereof. The processing may also include combining various types of data, such as, for exemplary purposes only and without limitation, associating an audio recording that was taken approximately contemporaneously with certain imagery (e.g., 2D imagery, 3D imagery, still imagery, videography, and/or combinations thereof).

As discussed above, vehicle system 120, vehicle system 130, and mobile device 140 may have one or more sensors that may be used for gathering data, like sensors 122 and 132. For example, sensors may gather data including, but not limited to, traffic conditions, road conditions, traffic signals, temperature, velocity, speed, deceleration, acceleration, humidity, braking force, image data, audio data, video data, heart rate, blood pressure, or other medical data, or any other data that may be indicative of a current state or activity of vehicle 120, vehicle 130, mobile device 140, or a person associated with one or more of vehicle 120, vehicle 130 or mobile device 140. Data may be gathered, for exemplary purposes only and without limitation, via a physical device installed on or used in vehicle 121 or vehicle 131, via software and/or sensors natively present in the car (e.g., visible light cameras, radar, audio sensors), sensors that may be components of other devices (e.g., health and fitness sensors, smart watches, other medical monitors, mobile devices), or systems that are remote from vehicle system 120, vehicle system 130, or mobile device 140, like traffic cameras, security cameras, or the like.

Figure 2:
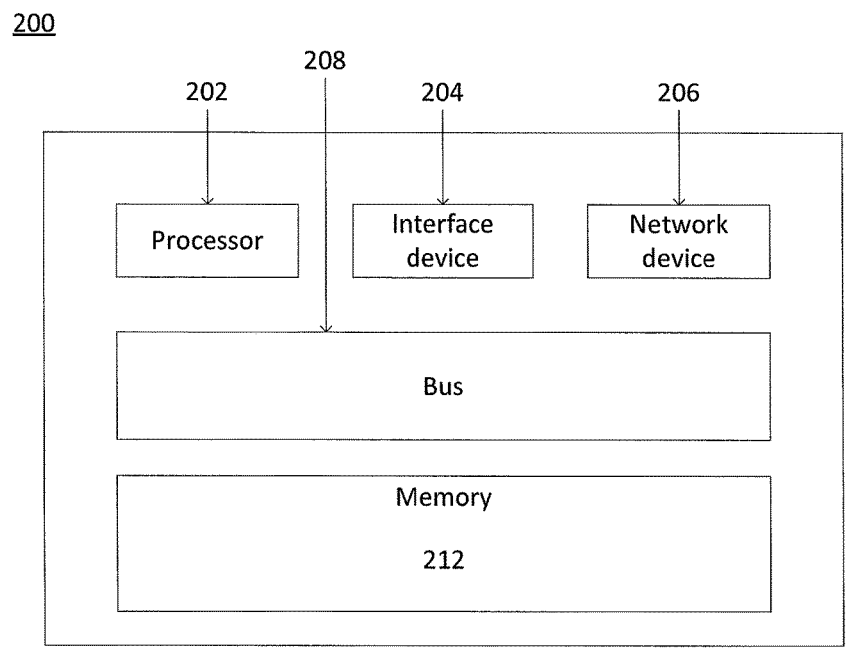
FIG. 2 is a flowchart depicting an exemplary method for capturing data related to a proximate event.

FIG. 2 is an exemplary computing device 200 that may comprise all or part of the systems and methods disclosed herein. Computing device 200 may include a processor 202, an interface device 204, a network device 206, a bus 208, or memory 210.

Memory 210 may comprise any non-transitory storage media. Memory 210 may be volatile or nonvolatile. Memory 210 is not to be construed as a propagating signal per se. Memory 210 may include magnetic, optical, biological, or atomic data storage medium. Memory 210 may store computer-readable instructions, and processor 202 may perform operations by executing the computer-readable instructions.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 210 or separately in any of hardware (e.g., electronic circuitry), firmware, software, or a combination thereof. In one embodiment, engines/modules contain instructions for controlling processor 202 to execute the methods described herein. Examples of these methods are explained in further detail with reference to FIG. 3.

Figure 3:
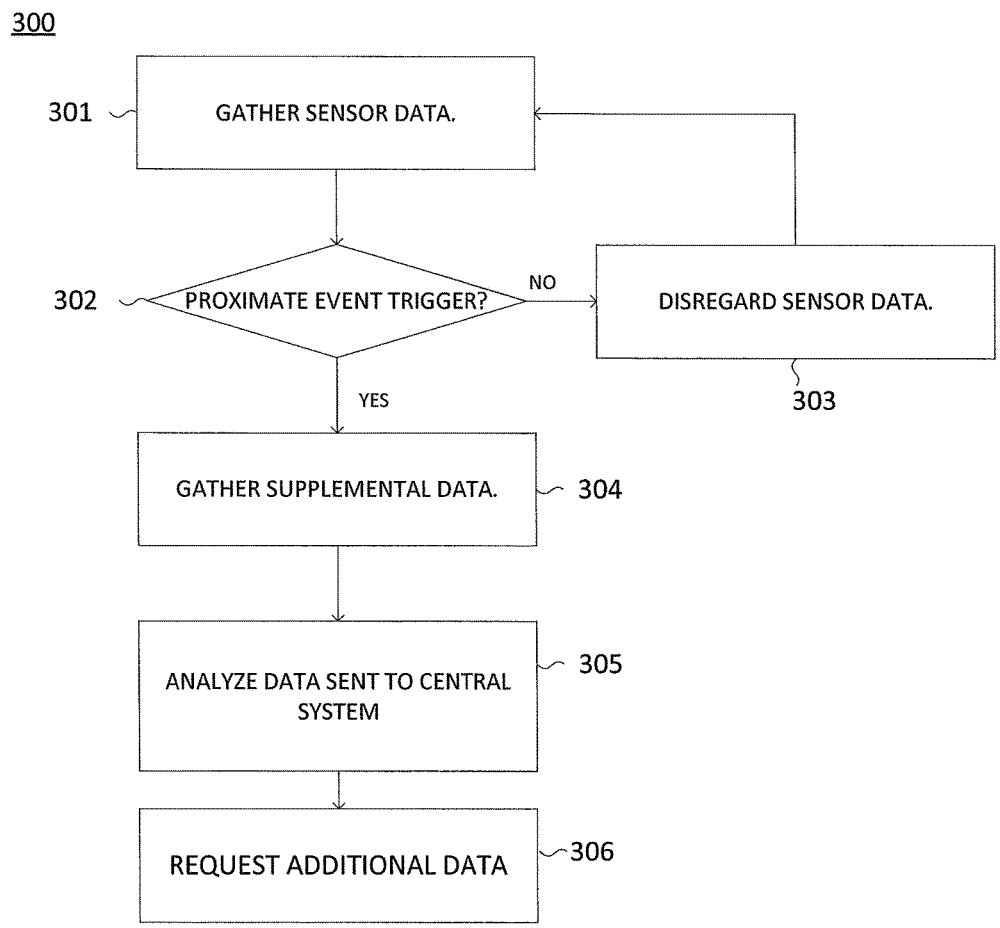
FIG. 3 is a schematic of an exemplary implementation of sensors on a vehicle.

FIG. 3 illustrates an exemplary method 300 that can be used for proximate event capture. At step 301, sensor data may be gathered from one or more of vehicle system 120 or mobile device 140 associated with a driver. This sensor data may include data regarding the operation of vehicle 121, such as braking force, speed, acceleration, deceleration, data indicating the distance between vehicle 121 and other objects or vehicles (e.g., vehicle 131), or the like. Data gathered at step 301 may also be data regarding the driver or other persons in vehicle 121, including audio or imagery data captured inside vehicle 121, and data captured by health/fitness monitoring equipment, like heart rate data. Vehicle 121 may capture data regarding the driver's grip on the steering wheel, for example.

For example, at step 301, one or more sensors may continuously and/or periodically (e.g., constant video, a still frame every second) record data into a buffer that stores a certain amount of data (e.g., the previous five minutes). In this example, data is continuously gathered and data from the previous five minutes is saved, and thus data becoming older than five minutes is continuously being purged. Further, although a five-minute buffer is described and utilized herein, any size buffer, either measured via a pre-determined time and/or a pre-determined amount of data, may be utilized.

At step 302; method 300 may include determining whether a proximate event trigger has occurred based on the sensor data gathered at step 301. For example, method 300 may include concluding that an event trigger has occurred based on a spike in a heart rate associated with a person in or near vehicle 121. A trigger may include a braking force that indicates vehicle 121 is slamming on its brakes. A trigger may include yelling or other loud noise detected in or near vehicle 121. A trigger may include imagery or radar data indicating that an object or person is within a buffer area around vehicle 121. A trigger may indicate that an accident or emergency is imminent, such as a vehicular accident involving vehicle 121. A trigger may indicate a mechanical or user failure of vehicle 121, such as a flat tire or a medical emergency condition affecting the driver.

If, at step 302, it is determined that the sensor data collected at step 301 does not indicate a proximate event trigger, then method 300 may proceed to step 303. At step 303, the sensor data may be deleted, overwritten, dumped, or otherwise ignored. For example, sensor data gathered at step 301 may be stored in a buffer and, once it has been determined at step 302 that the buffer of data is no longer needed (that is, the data in the buffer does not include or indicate a proximate event trigger), then the buffer may be overwritten with new sensor data. Method 300 may return to step 301, and steps 301-303 may repeat, such as until an event trigger is detected at step 302.

If method 300 detects a proximate event trigger, method 300 proceeds to step 304. At step 304, supplemental data may be collected. For example, this may include collecting data from the same or additional systems from which data was collected at step 301. Optionally, this may include storing sensor data gathered at step 301. Supplemental data gathered at step 304 may be collected from multiple devices or sources, including devices or sources that are remote to vehicle 121, including devices associated with bystanders (e.g., mobile device 140), witnesses, or other vehicles 131 nearby, including other parties involved in an accident with vehicle 121. Step 304 may also include collecting data from stationary sources, like traffic cameras and other sensors, security cameras, and data regarding the general environment in which vehicle 121 is, like weather sensor data, including data indicative of wind, precipitation, and the like.

Within vehicle system 120, multiple sensors may collect data, such as via camera(s) in vehicle 121, audio devices in vehicle 121, temperature sensor(s) in vehicle 121, or any other data measuring/recording devices connected, physically or communicably, to vehicle 121. Such data gathering may be performed by any sensors in the area, be it the immediate area or a broader area.

Step 304 may include identifying possible sources of supplemental data. This may include broadcasting a request for data to devices in the location of vehicle 121. For example, data module 110 may have a registry or record of devices associated with data module 110. These devices may include devices associated with customers or subscribers subscribed to system 100. Data module 110 may have access to a location register indicate the locations of these devices. Based on location of vehicle 121, data module 110 may identify possible devices to collect data from and request data be collected by these devices. In addition to devices associated with customers and subscribers, data module 110 may identify other devices, such as public or governmental devices associated with the location of vehicle 121. Step 304 may include requesting that these devices start collecting or continue to collect sensor data.

At step 305, the supplemental data may be analyzed to determine whether additional data may be collected. For example, this may include determining from imagery data that vehicle 121 appears to have been rear ended, but the imagery data may not provide sufficient views of the rear of vehicle 121. Based on this analysis, at step 306, method 300 may include requesting additional data. This request may identify a specific type or focus of the additional data to be collected. Optionally, this request may be directed to a specific subset of devices.

It is contemplated herein that, after an accident and/or immediately before an accident, nearby devices (e.g., people's cell phones and/or mobile devices) may be notified and requested to gather data. This data may then be communicated to data management module 110, such as via vehicle 121.

It is further contemplated herein that sensors, such as cameras, on customer's vehicle 121 may continue to operate even when customer's vehicle 121 is not moving, turned off, or under any other circumstance. Thus, information may be gathered to determine the cause of damage to vehicle 121 in a non-moving incident (e.g., a shopping cart hitting parked vehicle 121).

It is further contemplated herein that sensors, such as cameras, may be placed anywhere in, on, or near vehicles 121 and vehicle 131 and other objects, such as embedded into glass such as one or more of the windshields.

It is further contemplated herein that the data, such as the imagery data, may be downloaded to data management module 110, such as via a cellular network. In an aspect, the data may be deleted after being communicated and/or the data may be stored temporarily or permanently.

Sensors may further include impact sensors, such as on a vehicle, and/or sensors that determine road condition at or before the time of the accident.

Vehicle 121 may alert or request nearby devices to record information by determining the GPS location of vehicle 121 and may send that information to a central server (e.g., data management module 110), the central server determining what resources are nearby (e.g., within 10 feet, a mile), and alerting or requesting those resources to record data as possible, and communicate that data back to the central server. Further, the alert to nearby resources may lead to the nearby resources volunteering data that was coincidentally captured approximately precedent and/or contemporaneous to receiving the alert (e.g., if a nearby person took a picture with their cell phone 5 seconds before the accident, the software on that person's cell phone could optionally request permission of that cell phone's user to communicate that image/video to the central server because that imagery may be useful for the accident reconstruction efforts).

It is further contemplated herein that sensors and/or devices may daisy chain their communications until they find a sensor/device that has network communication abilities to get the data to a central server.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject disclosure have been described with respect to the embodiments disclosed above, those skilled in the art will readily appreciate that changes and modifications may be made thereto without departing from the spirit and scope of the subject disclosure.

What is claimed is:

1. A method for collecting and managing sensor data in response to occurrence of an event, the method comprising executing instructions using a processor, the instructions for:
    collecting first data from a first sensor associated with a vehicle;
    collecting second data from a second sensor associated with the vehicle;
    determining, based on at least a portion of the first data and the second data, that an event involving the vehicle may occur;
    associating the first data and the second data with a first event associated with the vehicle; and
    stitching two or more two dimensional images together into one or more three dimensional images describing the event involving the vehicle, wherein the two or more two dimensional images are included in at least one of the first data and the second data, and wherein the one or more three dimensional images comprise a reconstruction of the event involving the vehicle.

2. The method of claim 1, wherein a mobile device located within the vehicle comprises the first sensor.

3. The method of claim 1, wherein the event comprises a mechanical failure of the vehicle.

4. The method of claim 1, wherein the event comprises a heart rate of a driver of the vehicle.

5. The method of claim 1, wherein the first data includes at least one of velocity, acceleration, braking force, or distance between the vehicle and another object.

6. The method of claim 1, wherein identifying the second sensor comprises: determining a location of the vehicle; and
    cross-referencing the location with a database of devices registered with a communication engine to identify a plurality of nearby devices within a radius of the vehicle.

7. The method of claim 6, further comprising:
    sending an alert to at least one of the plurality of nearby devices based on the event.

8. The method of claim 1, wherein the first sensor is embedded into glass of a windshield of the vehicle.

9. The method of claim 1, wherein the first data includes weather sensor data.

10. The method of claim 1, wherein the second sensor is a component of a nearby vehicle or a mobile device.

11. A system comprising:
    a processor; and
    memory storing instructions that cause the processor to effectuate operations, the processor is configured to:
        collect first data from a first sensor associated with a vehicle;
        collect second data from a second sensor associated with the vehicle;
        determine based on at least a portion of the first data and the second data, that an event involving the vehicle may occur;
        associate the first data and the second data with a first event associated with the vehicle; and
        stitch two or more two dimensional images together into one or more three dimensional images describing the event involving the vehicle, wherein the two or more two dimensional images are included in at least one of the first data and the second data, and wherein the one or more three dimensional images comprise a reconstruction of the event involving the vehicle.

12. The system of claim 11, wherein a mobile device located within the vehicle comprises the first sensor.

13. The system of claim 11, wherein the event comprises a vehicular accident.

14. The system of claim 11, wherein the event comprises a medical condition of a driver of the vehicle.

15. The system of claim 11, wherein identifying the second sensor comprises: determining a location of the vehicle; and
    cross-referencing the location with a database of devices registered with a communication engine to identify a plurality of nearby devices within a radius of the vehicle.

16. The system of claim 11, wherein the second sensor is a component of a nearby vehicle.

17. The system of claim 11, wherein the second sensor is a mobile device.

18. A nontransitory computer-readable storage medium storing instructions that cause a processor executing the instructions to effectuate operations, the operations comprising:
    collecting first data from a first sensor associated with a vehicle;
    collecting second data from a second sensor associated with the vehicle;
    determining, based on at least a portion of the first data and the second data, that an event involving the vehicle may occur;
    associating the first data and the second data with a first event associated with the vehicle; and
    stitching two or more two dimensional images together into one or more three dimensional images describing the event involving the vehicle, wherein the two or more two dimensional images are included in at least one of the first data and the second data, and wherein the one or more three dimensional images comprise a reconstruction of the event involving the vehicle.

19. The nontransitory storage medium of claim 18, wherein identifying the second sensor comprises:
    determining a location of the vehicle; and
    cross-referencing the location with a database of devices registered with a communication engine to identify a plurality of nearby devices within a radius of the vehicle.

20. The at least one nontransitory storage medium of claim 18, wherein the second sensor is a component of a nearby vehicle or a mobile device.

* * * * *

UNITED STATES PATENT AND TRADEMARK OFFICE
CERTIFICATE OF CORRECTION

| | | |
|---|---|---|
| PATENT NO. | : 10,336,343 B1 | Page 1 of 1 |
| APPLICATION NO. | : 16/012260 | |
| DATED | : July 2, 2019 | |
| INVENTOR(S) | : Kevin K. Fiedler et al. | |

It is certified that error appears in the above-identified patent and that said Letters Patent is hereby corrected as shown below:

In the Claims

Column 9, Line 1, under Claim 20:
It reads:
20. The at least one nontransitory storage medium of claim 18, wherein the second sensor is a component of a nearby vehicle or a mobile device.

It should read:
20. The nontransitory storage medium of claim 18, wherein the second sensor is a component of a nearby vehicle or a mobile device.

Signed and Sealed this
Third Day of September, 2019

Andrei Iancu
*Director of the United States Patent and Trademark Office*